United States Patent [19]

Suda et al.

[11] Patent Number: 5,005,041
[45] Date of Patent: Apr. 2, 1991

[54] FOCUS DETECTING APPARATUS HAVING A PLURALITY OF FOCUS DETECTING AREAS

[75] Inventors: Yasuo Suda; Keiji Ohtaka; Kenji Suzuki; Akira Ishizaki; Keisuke Aoyama, all of Yokohama, Japan

[73] Assignee: Canon Kabushiki Kaisha, Tokyo, Japan

[21] Appl. No.: 266,804

[22] Filed: Nov. 3, 1988

[30] Foreign Application Priority Data

Nov. 5, 1987 [JP] Japan ................ 62-279835
Nov. 5, 1987 [JP] Japan ................ 62-279836
Nov. 5, 1987 [JP] Japan ................ 62-279837

[51] Int. Cl.$^5$ .................. G03B 13/36; G02B 7/34
[52] U.S. Cl. ................... 354/407; 250/201.8
[58] Field of Search .......... 354/402, 406, 407, 408; 250/201 R, 201 AF, 201 PF, 204, 201.2, 201.8

[56] References Cited

U.S. PATENT DOCUMENTS

| | | | |
|---|---|---|---|
| 4,563,576 | 1/1986 | Matsumura et al. | 250/204 |
| 4,636,627 | 1/1987 | Matsumura | 250/201 |
| 4,659,917 | 4/1987 | Suzuki et al. | 250/201 |
| 4,792,669 | 12/1988 | Ohnuki et al. | 250/201 |
| 4,821,074 | 4/1989 | Nakai et al. | 354/406 X |
| 4,857,718 | 8/1989 | Karasaki et al. | 250/201 |
| 4,857,720 | 8/1989 | Karasaki | 354/408 X |

FOREIGN PATENT DOCUMENTS

| | | |
|---|---|---|
| 62-33564 | 2/1987 | Japan . |
| 62-47612 | 3/1987 | Japan . |
| 62-189415 | 8/1987 | Japan . |

*Primary Examiner*—W. B. Perkey
*Attorney, Agent, or Firm*—Fitzpatrick, Cella, Harper & Scinto

[57] ABSTRACT

A focus detecting apparatus is provided with an optical assembly having a plurality of components disposed near the predetermined imaging plane of an objective lens and performing the actions of different field lenses, a re-imaging lens unit for receiving a light beam from the optical assembly and forming light distributions whose relative position changes in conformity with the focus adjusted state of the objective lens, and a photoelectric converting device having a plurality of sensor arrangements for receiving the light distributions and converting the light distributions into electrical signals. Predetermined one of the sensor arrangements are adapted to receive the light beam from predetermined ones of the portions of the optical assembly.

10 Claims, 8 Drawing Sheets

FOCUS DETECTING APPARATUS HAVING A PLURALITY OF FOCUS DETECTING AREAS

BACKGROUND OF THE INVENTION

1. Field of the Invention

This invention relates to a focus detecting apparatus, and in particular to an apparatus for detecting the focus adjusted state of an objective lens.

2. Related Background Art

It is very common that a photographic camera or a video camera contains therein a detecting apparatus for automatic focus adjustment. However, it is at the center of the view finder that the distance measuring range is determined, and a camera in which the focus is adjusted to an object at a desired position in the picture plane of the finder has not yet been realized.

That is, when the focus detecting area is set at the center of the picture plane, there is no problem if the major portion of an object lies at the center of the picture plane, but if the major portion of the object is off the center of the picture plane, there is the inconvenience that erroneous distance measurement is caused and results in a blurred photograph. In order to eliminate such difficulty, the camera is once moved laterally and distance measurement is effected with the major portion of the object placed at the center of the picture plane, and the direction of the camera is returned to its original position while the then focus adjusted state is kept, whereafter the operation of releasing the shutter is performed. However, such operation is cumbersome, and cannot be executed in an urgent case. For example, it has been difficult to meet the requirement of taking a photograph in which a laterally moving object lies at a position off the center of the picture plane.

On the other hand, well known in an apparatus in which the imaging light beam received by an objective lens is directed to a set of re-imaging lenses and distributions of light quantity formed by these lenses are received by the picture element rows of a photoelectric converting element and the focus adjusted state of the objective lens is detected from the interval between the distributions of light quantity.

As a method for meeting the above-described requirement of effecting distance measurement without moving the camera with respect to the object lying at a position off the center of the picture plane, it is conceivable to dispose another picture element row outside the picture element row disposed on the optic axis and cause the newly provided picture element row to receive an object image off the center of the picture plane.

Japanese Laid-Open Patent Application No. 62-47612 and Japanese Laid-Open Patent Application No. 62-189415 disclose a focus detecting apparatus having a number of focus detecting areas. Also, for example, in U.S. Pat. No. 4,636,627, there is described an apparatus provided with a plurality of field controlling apertures.

Generally, in an optical lens system, aberrations are corrected well, but yet aberrations remain and the focus detecting area on or near the optic axis of the objective lens and the focus detecting area far from the optic axis differ greatly in the imaged condition on the picture element row as viewed, with the required performance as the standard. Accordingly, in the focus detecting area far from the optic axis, detection as accurate as that in the focus detecting area near to the optic axis cannot be realized, and this leads to the difficulty that highly accurate detection is limited to the focus detecting area near to the optic axis.

SUMMARY OF THE INVENTION

The present invention intends to enable detection to be accomplished with good focus detection accuracy not only at a position near to the optic axis of the objective lens but also at a position far from the optic axis.

DESCRIPTION OF THE PREFERRED EMBODIMENTS

The focus detecting apparatus of the present invention can be used in a single-lens reflex camera using silver salt film and a single-lens reflex electronic camera or a video camera, and in addition, can be used in a recording apparatus and a position detecting apparatus of a working machine or the eye of a robot.

Figure 6:
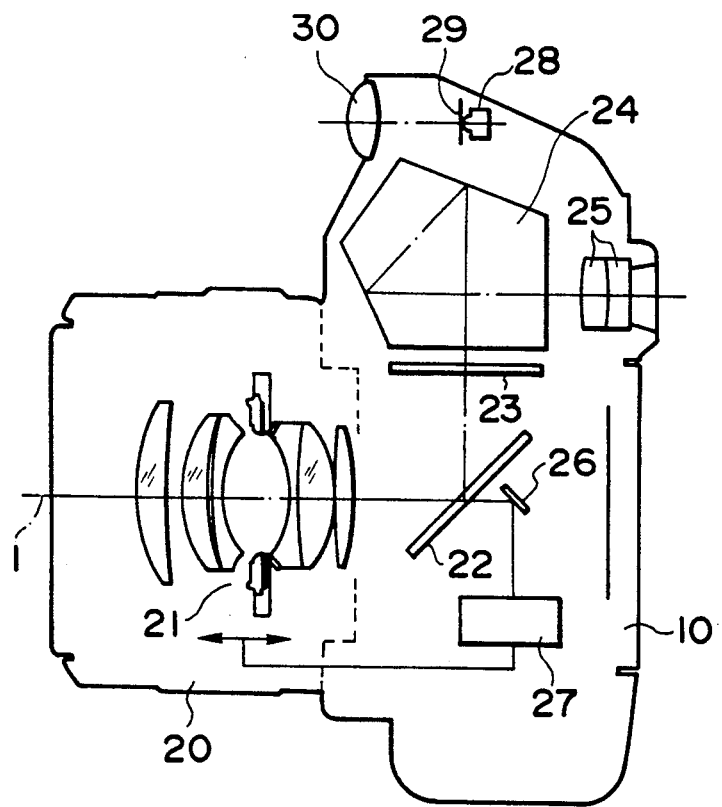
FIG. 6 is a cross-sectional view showing an example of the application of the present invention to a camera.

FIG. 6 shows an example of the form in which the present invention is used, and depicts the optical system of a single lens reflex camera The reference numeral 10 designates a camera body, and the reference numeral 20 denotes a removable or fixed lens barrel. The reference numeral 21 designates an objective lens, and the reference numeral 1 denotes the optic axis thereof The optic axis 1 reaches a quick return mirror (main mirror) 22 provided with a semi-transmitting, area, and is divided into two. A focusing screen 23, a pentaprism 24 and an eyepiece 25 are successively disposed along the reflected optic axis, and these together constitute a finder system for visual confirmation. A movable sub-mirror 26 and a focus detecting apparatus 27 according to the present invention are disposed along the transmitted optic axis, and a driver, not shown, is operated by the output of the focus detecting apparatus 27, whereby the position of the objective lens 21 is adjusted The movable sub-mirror 26 is held by the quick return mirror 22, as is well known. The reference numeral 28 designates the light source such as an LED, of an object illuminating device, and the light source 28 illuminates a projection chart 29 formed with a projection pattern, and the light transmitted therethrough is projected by a projection lens 30.

Figure 1:
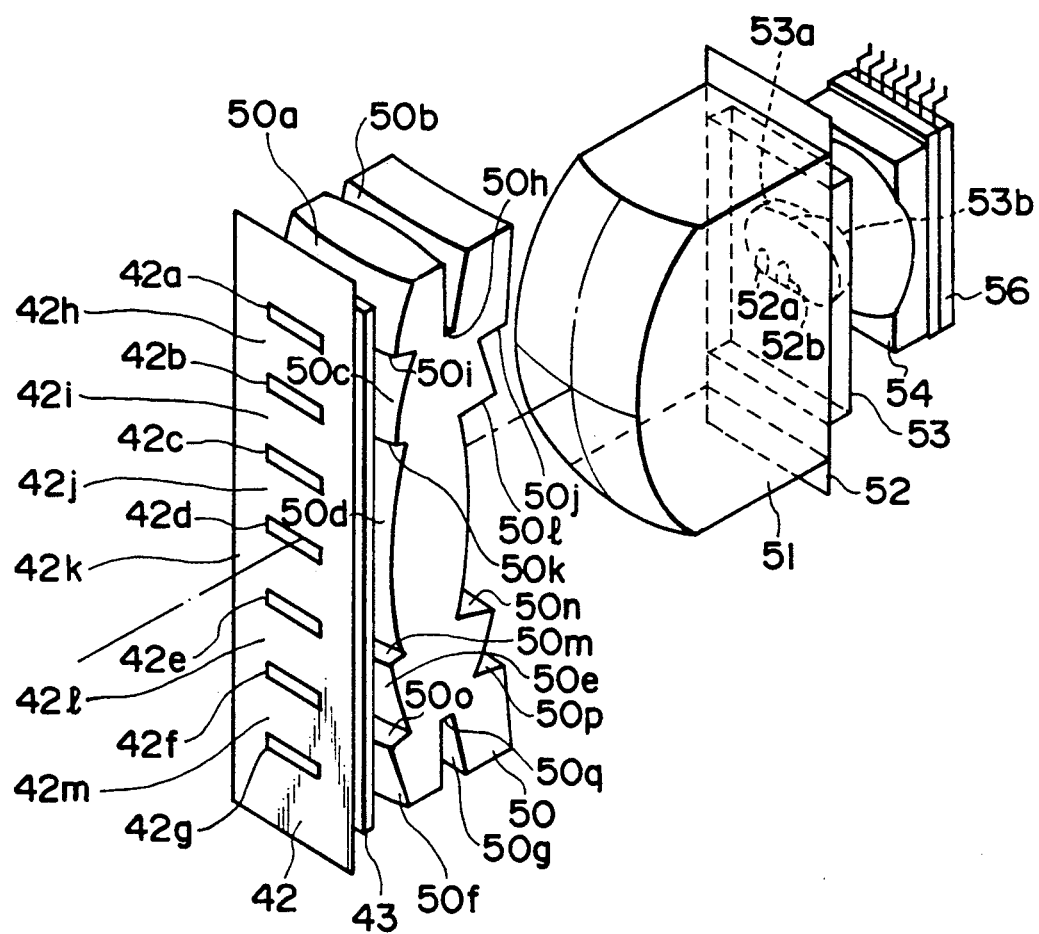
FIG. 1 is a perspective view showing an embodiment of the present invention.
Figure 2:
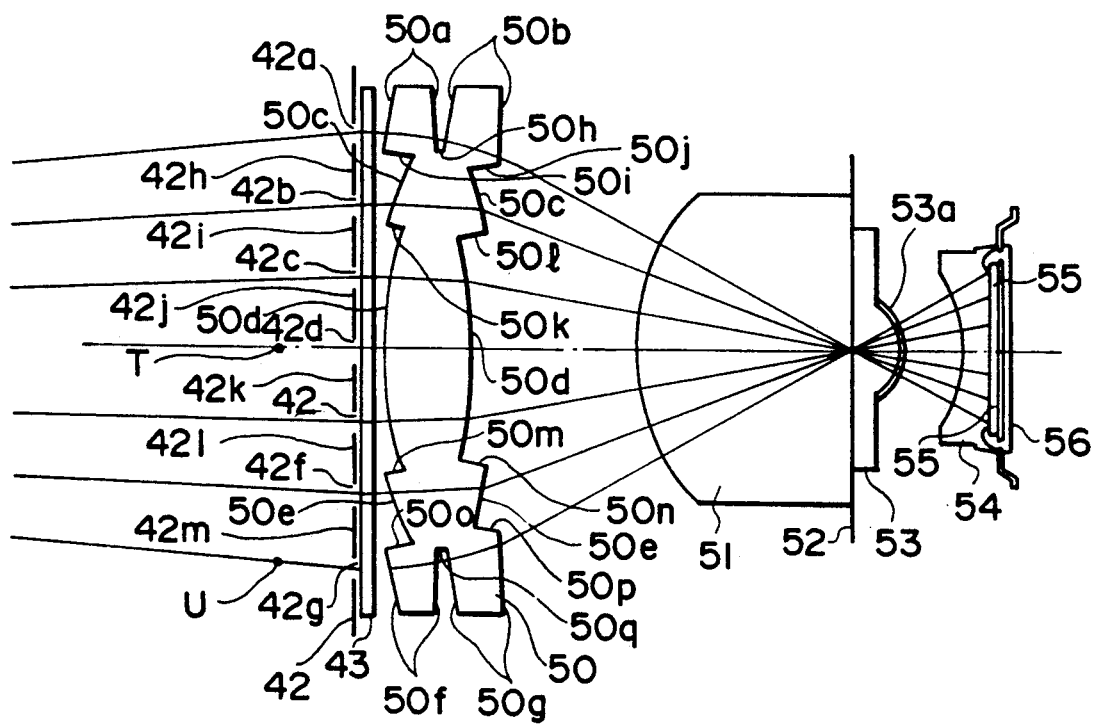
FIG. 2 is an optical cross-sectional view of the FIG. 1 embodiment.
Figure 3:
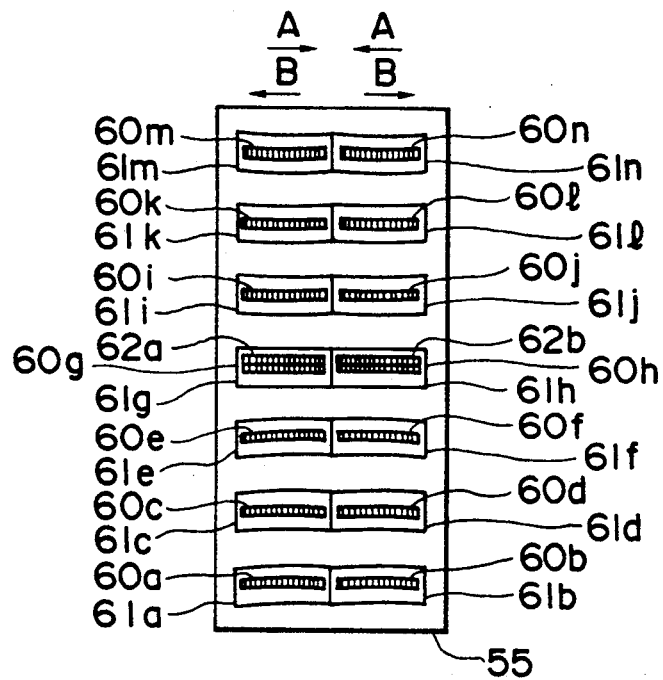
FIG. 3 is a front view of a photoelectric converting device.

The construction of the focus detecting apparatus designated by 27 will hereinafter be described with reference to FIGS. 1 to 3. FIG. 1 shows a perspective view of the focus detecting apparatus, FIG. 2 shows the longitudinal cross-sectional shape thereof, and FIG. 3 shows the positional relation between the picture element rows of a photoelectric converting device comprising a single chip and the distribution of quantity of the light. The reference numeral 42 designates a multi-aperture field mask having rectangular openings having longer sides laterally thereof and arranged side by side, and disposed, for example, near the predetermined imaging plane of the objective lens 21 of FIG. 6. The reference numeral 43 denotes a filter for intercepting light of longer wavelengths than near-infrared light, and the reference numeral 50 designates a combined field lens disposed somewhat off the predetermined imaging plane of the objective lens. The combined field lens 50 comprises lens portions 50a, 50b, 50c, 50d, 50e, 50f and 50g differing in optical action from one another as will be described later, and these portions are formed by changing one or both of the thickness of the lens and the radius of curvature of the lens surface. Where the respective lens portions are to be constructed discretely from one another, they can be made of materials differing in refractive index from one another.

The reference numerals 51 and 53 designate a convex lens and a two-image forming lens, respectively, disposed at the opposite sides of a two-aperture diaphragm 52 to form a re-imaging lens unit. The convex lens 51 converts the incident light into a state approximate to a parallel light (the optical action of this convex lens is described in Japanese Patent Publication No. 62-33564), and the two-image forming lens 53 comprising two convex lenses 53a and 53b arranged side by side and joined together forms two secondary images of the object image formed by the objective lens. The aforementioned two-aperture diaphragm 52 is provided with vertically longer elliptical openings 52a and 52b arranged laterally side by side, as viewed in FIG. 1.

The reference numeral 54 denotes a concave lens for correcting curvature of image field. The concave lens 54 is disposed on a transparent plastic package 56 containing a photoelectric converting device 55 (FIGS. 2 and 3) therein. The configurations of the combined field lens 50, the convex lens 51 of the re-imaging lens unit and the concave lens 54 are vertically longer, but the lens surfaces thereof are all rotation-symmetrical spherical lens systems.

Light beams passed through the openings 42a–42g in the multi-aperture field mask 42 are transmitted through the lens portions 50a, 50b, 50c, 50d, 50e, 50f and 50g of the combined field lens 50 as shown in FIG. 2, and form the secondary images of the object on the photoelectric converting device. FIG. 3 shows this state, and 60a and 60b, . . . , 60m and 60n, and 62a and 62b designate sets of picture element rows comprising a number of picture elements, and a filter having a band-pass characteristic substantially equal to the wavelength of the emitted light of the object illuminating device which will be described later is formed on the picture element row 62a, 62b. The images 61a, . . . , 61n of the openings 42a, . . . , 42g in the multi-aperture field mask are projected correspondingly on these picture element rows, and the secondary images of the object are formed therein. At that time, the refractive powers of the lens portions of an optical system relaying the mask 42 and the device 55, particularly, the combined field lens and the re-imaging lens unit, are adjusted in accordance with the width of each opening in the multi-aperture field mask 42, the width of light-intercepting zones 42h, . . . , 42m between the openings, the width of the picture element rows on the photoelectric converting device 55 and the pitch of the picture element rows, and therefore, the light-intercepting zones 42g, . . . , 42m of the multi-aperture field mask prevent a part of the light beam having emerged from a predetermined opening from entering the other picture element rows than the picture element rows corresponding at 1:1 to this opening. Also, two images of the field mask are formed laterally side by side per opening in the multi-aperture field mask 42 by the actions of the diaphragm openings 52a, 52b and the lens portions 53a, 53b, and the secondary images of the object therein move in the direction of arrow A and the direction of arrow B in the relation to the position of the object image relative to the predetermined imaging plane. Accordingly, each set of picture element rows detects the relative interval of the distribution of quantity of light regarding the secondary images forming a pair, on the basis of the photoelectric conversion output and therefore, the focused condition of the objective lens can be known with regard to a plurality of distance measuring positions.

It is desirable that the picture element rows be of a shape conforming to the distortion of the image of the field mask and be constructed so that the direction of movement of said secondary image completely coincides with the direction of the picture element rows. Although the shown picture element rows form sets in a separated form and thereby make an arrangement, two ranges of a picture element row may be allotted and these ranges may form a set.

Figure 7:
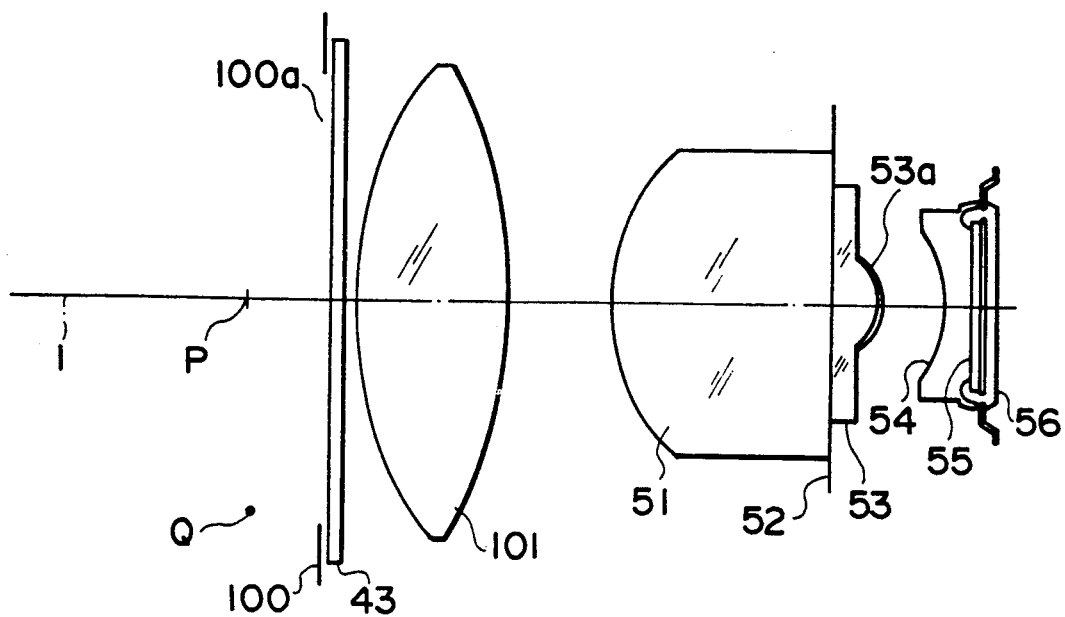
FIG. 7 is an optical cross-sectional view of an optical apparatus for comparative illustration.

The action of the combined field lens will now be described, but for the sake of comparison, a description will first be given of the optical action of the construction of FIG. 7 in which a field lens 101 and a single-aperture field mask 100 are provided instead of the combined field lens and the multi-aperture field stop according to the embodiment of the present invention. What is called light here may be not only visible light, but also infrared and near-infrared light.

Figure 8:
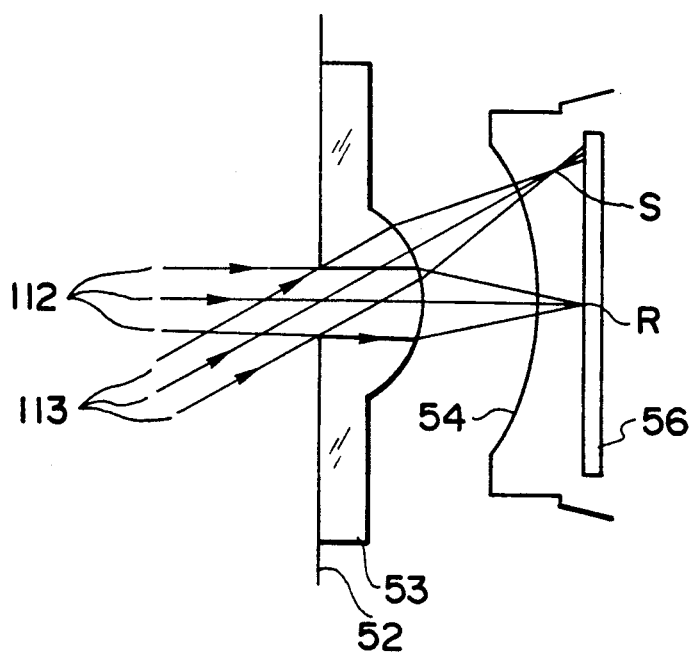
FIG. 8 is a cross-sectional view of optical portions shown in FIG. 7.

Both of a point P on the optic axis in the focus detecting area and a point Q in the focus detecting area outside the optic axis are on the predetermined imaging plane, and the state of the light beam when these points are projected onto the photoelectric converting device 55 through an opening 100a in the field mask is as shown in FIG. 8. In FIG. 8, the reference numerals 112 and 113 designate light rays emitted from the points P and Q, respectively, and their imaging points are a point R on the photoelectric converting element and a point S in the concave lens 54. Where this focus detecting apparatus is applied to a single-lens reflex camera, the distance between the point P and the point Q is of the order of 6–15 mm and further, the distance from the point P to the photoelectric converting element is also limited to the order of 20–35 mm and therefore, even if the concave lens 54 for correcting curvature of image field is used, such deviation of the secondary image surface by the focus detecting area cannot be eliminated. As a result, the accuracy of focus detection is greatly varied by the focus detecting area and this is not preferable.

On the other hand, in a field lens construction of a simple form, it is very difficult to make a such design that neither the light beam passing through the focus detecting area near to the optic axis 1 nor the light beam passing through the focus detecting area far from the optic axis 1 are eclipsed by the objective lens 21.

Figure 9:
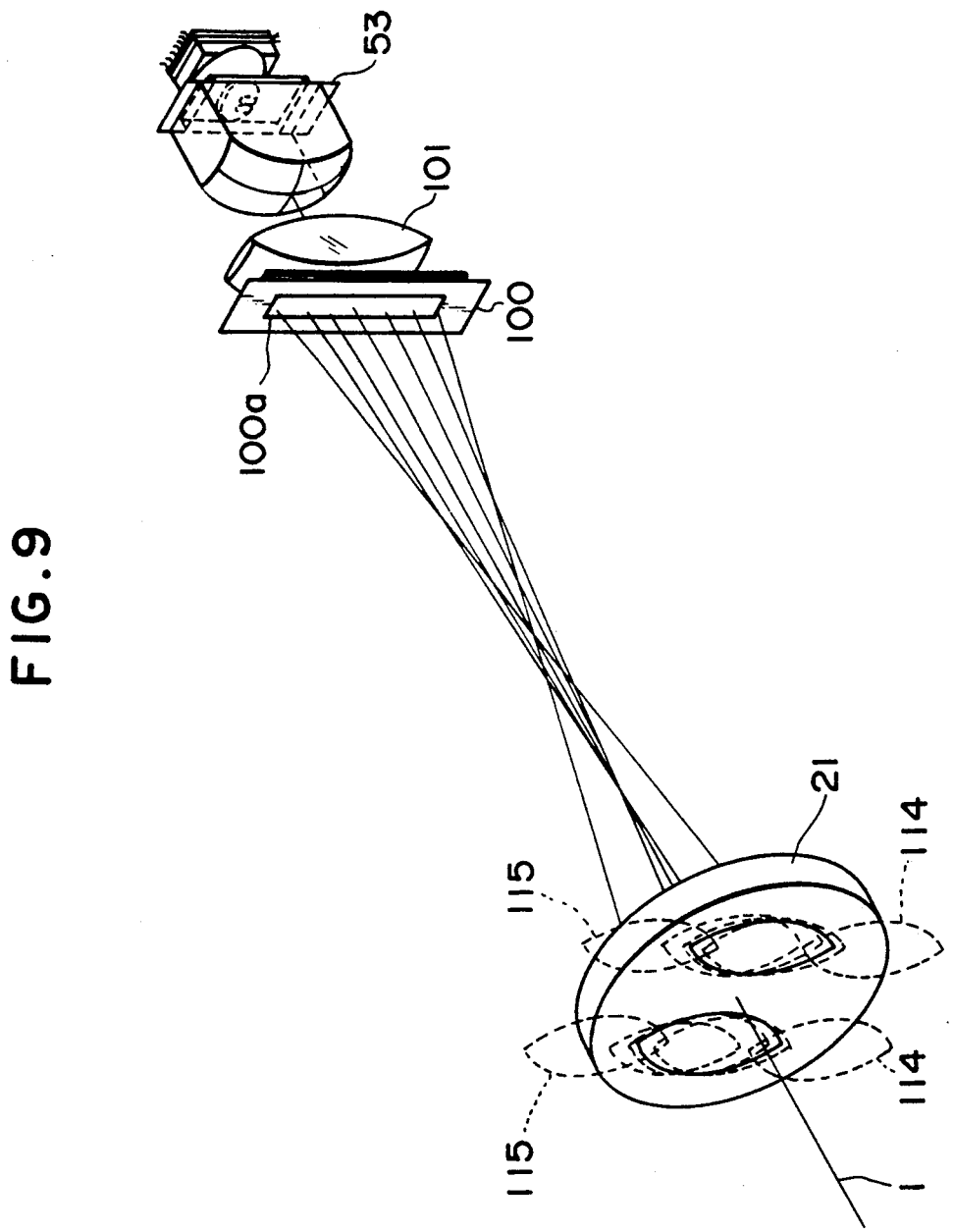
FIG. 9 is a perspective view of the FIG. 7 apparatus for comparative illustration.

The eclipse of the light beam will hereinafter be described with reference to FIG. 9. In FIG. 9, the reference numerals 114 and 115 designate the images of two openings in a two-aperture diaphragm as they are reversely projected onto the exit pupil of the objective lens 21 through the opening 100a in the field mask at each picture element row position, and conversely, the light beam passed through these areas 114 and 115 and passed through the opening 100a in the field mask passes through the diaphragm to the photoelectric converting device. Accordingly, where as shown, the conversely projected areas 114 and 115 are off the exit pupil of the objective lens, the focus detecting light beam which should arrive at the photoelectric converting element is eclipsed by the objective lens and therefore, the accuracy of focus detection is remarkably reduced or focus detection becomes impossible.

In an ordinary field lens, it is impossible to correct the above-described difficulty in the optical action and therefore, the light beam having emerged from the opening outside the multi-aperture field stop and the light beam having emerged from the opening near the optic axis can be corrected if corrected by discrete field lenses.

Figure 4:
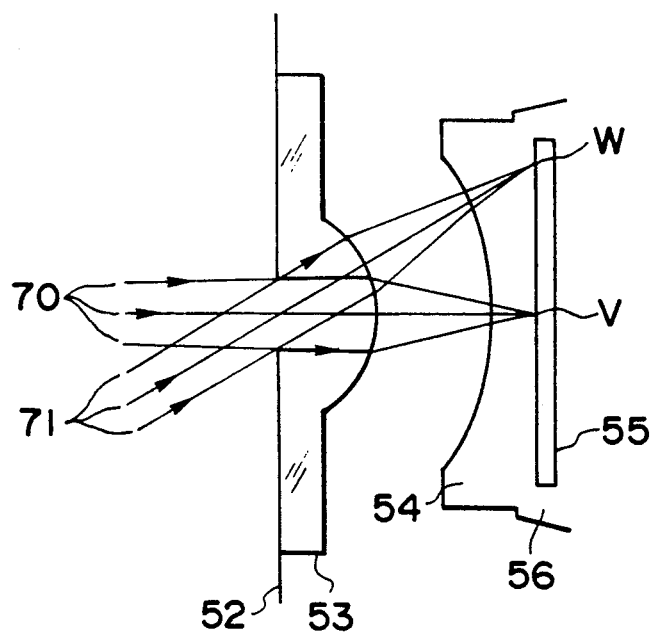
FIG. 4 is a cross-sectional view of an optical portion of the FIG. 1 embodiment.

The effect of the combined field lens according to the present invention will now be described with reference to FIGS. 4 and 5. FIG. 4 shows the manner in which a point T (FIG. 2) in the focus detecting area on the optic axis lying on the predetermined imaging plane and a point U in the focus detecting area off the optic axis are projected onto the photoelectric converting element through openings 42d and 42g in the field mask, and in FIG. 4, the reference numeral 70 designates a light ray emitted from the point T, and the reference numeral 71 denotes a light ray emitted from the point U. As shown in FIG. 2, the light ray 70 is transmitted through the central lens portion 50d of the field lens, while the light ray 71 is transmitted through the marginal lens portions 50f and 50g of the field lens, while the light ray 71 is transmitted through the marginal lens portions 50f and 50g of the field lens. At this time, these two lens portions are constructed so as to make uniform the imaged state on the photoelectric converting device and qualitatively, the lens thicknesses of the lens portions 50f and 50g are increased, whereby the imaged points of the points T and U are points V and W both lying on the photoelectric converting device. As a result, it becomes possible to keep the accuracy of focus detection of each focus detecting area uniformly high.

Figure 5:
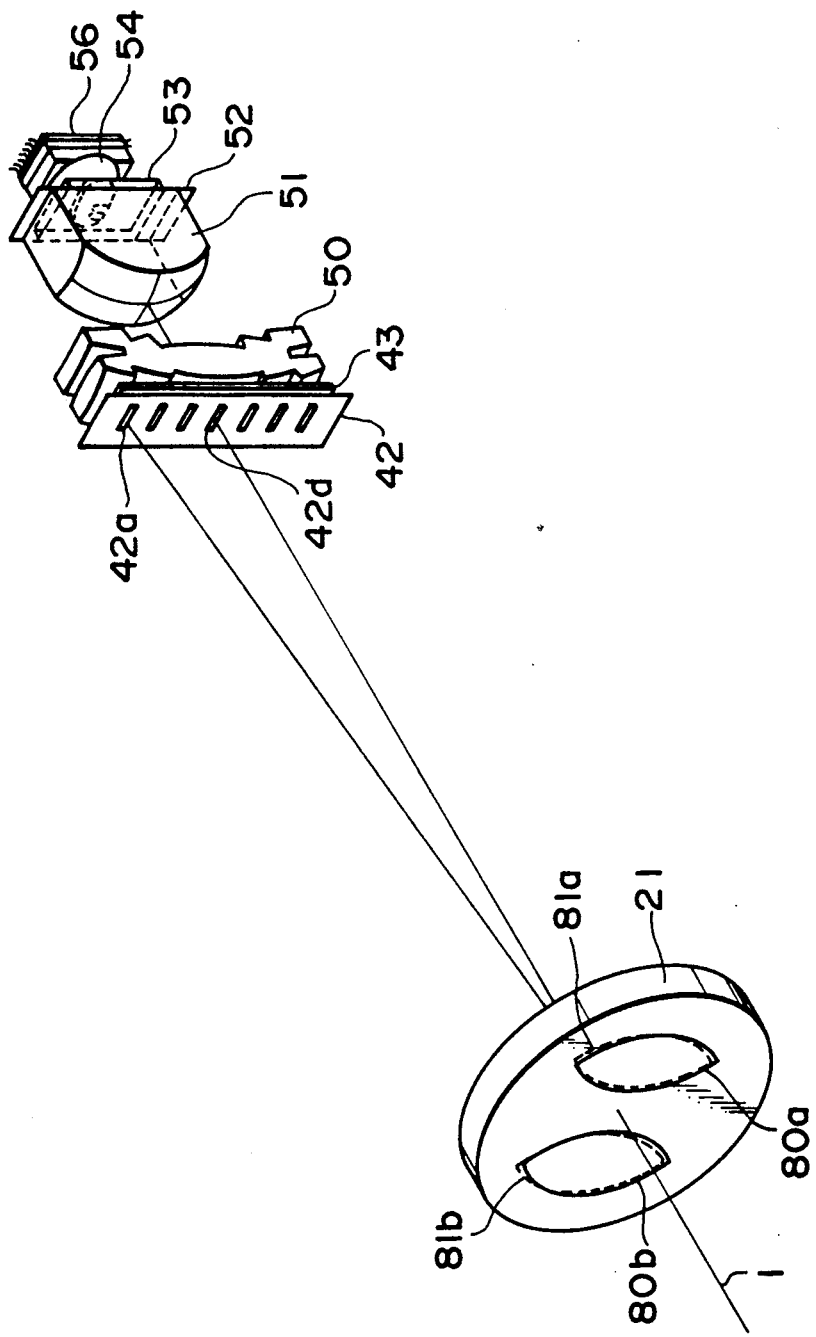
FIG. 5 is a perspective view of a portion of the FIG. 7 embodiment.

FIG. 5 shows the images of the two openings 52a and 52b in the diaphragm 52 as they are reversely projected onto the exit pupil of the objective lens through the endmost opening 42a in the multi-aperture field mask and the field mask opening 42d on the optic axis. In FIG. 5, the reference characters 80a, 81a and 80b, 81b designate the reversely projected images of the diaphragm openings 52a and 52b (FIG. 1), and the images 80a, 81b are ones passed through the field mask opening 42d and the images 81a, 81b are ones passed through the field mask opening 42a. As can be seen from FIG. 5, the field lens is optimized for each focus detecting area, whereby a construction in which the focus detecting light beam is not eclipsed in any focus detecting area is possible As a result, the position of the focus detecting area can be set to a wide range without being limited to the vicinity of the optic axis 1.

The light travelling toward the joined portions 50h–50g of the field lens is intercepted by the light-intercepting zones 42h, 42i, 42l and 42m of the field mask, whereby creation of ghost light by the incidence of light onto these portions is prevented.

Also, the combined field lens shown is made by unitary molding of plastics, but may alternatively be constructed by coupling the respective lens portions after they have been made.

Figure 10:
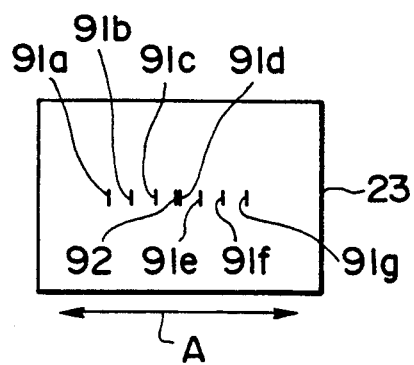
FIG. 10 is a plan view of the observation field of the FIG. 1 embodiment.

FIG. 10 shows the arrangement of the focus detecting areas on the picture plane, and with respect to the single-lens reflex camera of FIG. 6, they are laid out on the focusing screen 23 so that the focus detecting areas 91a, ..., 91g and 92 are arranged parallel to one another on the central axis in the direction of the longer side thereof.

If the sets 60a, 60b, ..., 60m, 60n of the picture element rows of FIG. 3 are reversely projected onto the predetermined imaging plane by the imaging lens units and on the other hand, the focus detecting area of the focusing screen 23 is placed on the predetermined imaging plane, the arrangement of the sets of the picture element rows and the focus detecting areas will overlap each other at 1:1. The direction of arrangement of the sets of the picture element rows, in the relation to the members in the camera body, is a direction A coincident with the direction of the intersection (perpendicular to the plane of the drawing sheet) between a plane containing the translucent surface (the light-dividing surface) of the quick return mirror 22 and a plane containing the movable sub-mirror 26.

By adopting such arrangement, there is the advantage that the range from the focus detecting area at one end to the focus detecting area at the other end can be maximized without enlarging the vertical width of the movable sub-mirror.

Figure 11:
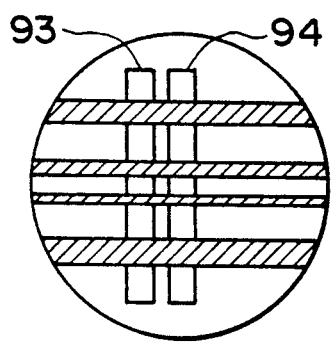
FIG. 11 shows the relation between the projected pattern and the picture element rows of the FIG. 1 embodiment.

The lateral stripe pattern of FIG. 11 shows an example of the projected pattern projected onto an object of low contrast or low luminance, and is depicted in the chart 29 of FIG. 6. Assuming that this figure is the image of the projected pattern projected onto the object, the reference numeral 93 designates the distance measuring range when the set 62a, 62b of the picture element rows of FIG. 3 is reversely projected onto the object. As previously described, a band-pass filter of a wavelength substantially equal to the wavelength of the emitted light of the illuminating light source 28 (FIG. 6) is formed on the picture element rows 62a and 62b, and the picture element rows select and sense the projected pattern reflected by the object. Thereby, contrast is forcibly added even to an object which is usually difficult to detect, and the focus detection by the picture element rows 62a and 62b becomes possible. Incidentally, the reference numeral 94 designates the distance measuring range on the object by the picture element rows 60g and 62h.

In the above-described construction, the electrical signal from the photoelectric converting device 56 (FIG. 1, etc.) is read out for each picture element row, and is subjected to an in-focus detection operation, for example, in each focus detecting area, and various signal processing algorithms can be selected such as selecting the nearest object from the result thereof and effecting the focus adjustment of the objective lens, or examining the continuity of the degree of in-focus between adjacent focus detecting areas and selecting a near object within a range of strong continuity, or preselecting a predetermined focus detecting area and effecting focusing to an object which has come into that focus detecting area.

According to the present invention described above, the difference in optical performance between the focus detecting areas can be alleviated and therefore, the accuracy of focus detection of not only the central focus detecting area but also the outer focus detecting area can be kept uniformly high. Accordingly, multipoint distance measurement including the focus detecting area off the center can be realized.

Also, the position of the focus detecting area can be set relatively freely by a simple field lens construction.

We claim:

1. An apparatus for detecting the focus adjusted state of an objective lens, comprising:

a pair of light distribution forming lenses for forming a plurality of light distribution sets whose relative positions are displaced in conformity with the focus adjusted state of the objective lens, from a light beam passed through the objective lens;

sensing means provided with a plurality of arrangements of sensors for receiving said light distribution sets, and for outputting a signal regarding the relative positions of said light distributions sets, said signal being indicative of the focus adjusted state of the objective lens; and optical means for imparting the action of a field lens to a light beam incident on the arrangements of the sensors, said optical means having a plurality of components of different shapes and being disposed on or near a predetermined imaging plane of said objective lens, light fluxes from said plurality of components being introduced to said pair of lenses.

2. An apparatus according to claim 1, wherein incidence areas of said components of said optical means are formed parallel to each other.

3. An apparatus according to claim 1, wherein at least one lens surface of one of said components differs in curvature from a corresponding lens surface of another component.

4. An apparatus according to claim 1, wherein one of said components differs in thickness from another component.

5. An apparatus according to claim 1, further comprising a masking means disposed in proximity to said optical means and provided with a plurality of parallel apertures corresponding to the arrangements of said sensors.

6. An apparatus according to claim 5, wherein a portion between the apertures of said masking means intercepts light entering a portion at which two of said components are joined together.

7. A camera apparatus according to claim 1, further comprising a field flatener lens immediately forward of said sensing means.

8. A camera apparatus comprising:

a viewfinder for observing therethrough an object image formed by an objective lens;

an image receiving portion for receiving a photography image;

a focus detecting apparatus having (1) a pair of light distribution forming lenses for forming from the object image formed by the objective lens a plurality of light distribution sets whose relative positions change in conformity with a focus adjusted state of the objective lens, (2) sensing means provided with a plurality of parallel arrangements of sensors for receiving said light distribution sets, and for outputting a signal representative of the focus adjusted state of the objective lens, and (3) field lens means disposed on or near a predetermined imaging plane of the objective lens, said field lens having a plurality of lens components which provide a corresponding plurality of light fluxes to said pair of lenses; and light distribution means for distributing a light beam passed through said objective lens to one or two of (a) said viewfinder, (b) said image receiving portion, and (c) said focus detecting apparatus, said light distributing means having a main mirror for directing a reflected light to said viewfinder and a sub-mirror for directing the reflected light to said focus detecting apparatus;

said arrangements of said sensors being disposed parallel to one another in a direction parallel to the direction of a line formed by the intersection between a plane containing said main mirror and a plane containing said sub-mirror.

9. A camera apparatus according to claim 8, wherein said field lens means comprises a plurality of lens components differing in converging action from each other.

10. An apparatus for detecting the focus adjusted state of an objective lens, comprising:

a pair of secondary imaging lenses for forming from a light beam passed through the objective lens a pair of light distributions whose relative positions change in conformity with the focus adjusted state of the objective lens;

sensing means provided with a plurality of arrangements of sensors for receiving said light distributions, and for outputting a signal regarding the relative positions of the light distributions and indicative of the focus adjusted state of the objective lens; and a lens assembly for providing a field lens action and having a first component through which a light beam entering the sensor arrangement far from the optic axis of the objective lens passes, and a second component, different from said first component, through which a light beam entering the sensor arrangement near to the optic axis passes, to cause an imaging performance of the light beam entering the sensor arrangement far from the optic axis to be approximate to an imaging performance of the light beam entering the sensor arrangement near to the optic axis, light fluxes from both said first and second components being introduced to said pair of lenses.

* * * * *

UNITED STATES PATENT AND TRADEMARK OFFICE
CERTIFICATE OF CORRECTION

PATENT NO. : 5,005,041
DATED : April 2, 1991
INVENTOR(S) : Suda, et al.

It is certified that error appears in the above-identified patent and that said Letters Patent is hereby corrected as shown below:

On the title page:

[57] ABSTRACT

Line 12, "one" should read --ones--.

COLUMN 1

Line 36, "in" should read --is--.

COLUMN 2

Line 16, "Fig. 4" should begin a new paragraph.
Line 48, "thereof" should read --thereof.--;
Line 59, "adjusted" should read --adjusted.--; and
Line 62, "source" should read --source,--.

COLUMN 4

Line 4, "rows, and therefore," should read --rows. Therefore,--; and
Line 66, "such design" should read --design such--.

COLUMN 5

Line 66, "possible" should read --possible.--.

UNITED STATES PATENT AND TRADEMARK OFFICE
CERTIFICATE OF CORRECTION

PATENT NO. : 5,005,041

DATED : April 2, 1991

INVENTOR(S) : Suda, et al.

It is certified that error appears in the above-identified patent and that said Letters Patent is hereby corrected as shown below:

COLUMN 7

Line 25, "distributions" should read --distribution--; and

Line 57, "flatener" should read --flattener--.

Signed and Sealed this

First Day of December, 1992

Attest:

DOUGLAS B. COMER

*Attesting Officer*   *Acting Commissioner of Patents and Trademarks*